United States Patent
Cronholm

(10) Patent No.: US 10,439,819 B2
(45) Date of Patent: Oct. 8, 2019

(54) ASSET AUTHENTICATION IN A DYNAMIC, PROXIMITY-BASED NETWORK OF COMMUNICATION DEVICES

(71) Applicant: CRUNCHFISH PROXIMITY AB, Malmö (SE)

(72) Inventor: Paul Cronholm, Malmö (SE)

(73) Assignee: CRUNCHFISH PROXIMITY AB, Malmö (SE)

( * ) Notice: Subject to any disclaimer, the term of this patent is extended or adjusted under 35 U.S.C. 154(b) by 0 days.

(21) Appl. No.: 15/561,333

(22) PCT Filed: Mar. 24, 2016

(86) PCT No.: PCT/SE2016/050243
§ 371 (c)(1),
(2) Date: Sep. 25, 2017

(87) PCT Pub. No.: WO2016/153420
PCT Pub. Date: Sep. 29, 2016

(65) Prior Publication Data
US 2018/0062851 A1     Mar. 1, 2018

(30) Foreign Application Priority Data

Mar. 25, 2015   (SE) ...................... 1550357

(51) Int. Cl.
*H04L 29/06* (2006.01)
*H04L 9/32* (2006.01)
(Continued)

(52) U.S. Cl.
CPC .......... *H04L 9/3247* (2013.01); *H04L 9/0861* (2013.01); *H04L 9/14* (2013.01);
(Continued)

(58) Field of Classification Search
CPC . H04L 9/3247; H04L 9/30; H04L 9/14; H04L 9/0861; H04W 12/06
See application file for complete search history.

(56) References Cited

U.S. PATENT DOCUMENTS 8,467,770 B1 *  6/2013  Ben Ayed ............. H04L 63/107
                                                      455/411
8,583,915 B1 * 11/2013  Huang ................ H04L 63/0869
                                                      713/155
(Continued)

FOREIGN PATENT DOCUMENTS

| EP | 1557973 A1 | 7/2005 |
| EP | 2687277 A1 | 1/2014 |
| EP | 2750425 A1 | 7/2014 |

OTHER PUBLICATIONS

Ming et al., "Group Device Pairing based Secure Sensor Association and Key Management for body area network", 2010 Proceedings IEEE INFOCOM, Date of Conference: Mar. 14-19, (Year: 2010).*

(Continued)

*Primary Examiner* — Morshed Mehedi
(74) *Attorney, Agent, or Firm* — Burr & Forman LLP

(57) ABSTRACT

Asset authentication in a dynamic, proximity-based network of communication devices, each having a first interface for establishing the dynamic, proximity-based network by short-range wireless beacon broadcast messaging, and a second interface for communicating with a server by broadband communication. A first communication device sends (210) via the first interface an authentication request to a second communication device having an associated asset. The second device receives (220) the authentication request via the first interface and in response communicates (230) with the server via the second interface to generate a digital signature by encrypting data which includes the asset with a (Continued)

private key for the second device. The second device sends (240) a signing completed report message about the generation of the digital signature to the first device via the first interface. The first device receives (250) the signing completed report message via the first interface and in response communicates (260) with the server via the second interface to retrieve an authentication result.

11 Claims, 11 Drawing Sheets

(51) Int. Cl.
| | |
|---|---|
| *H04L 9/08* | (2006.01) |
| *H04L 9/14* | (2006.01) |
| *H04L 9/30* | (2006.01) |
| *H04W 12/06* | (2009.01) |
| *H04W 84/18* | (2009.01) |
| *H04W 88/04* | (2009.01) |
| *H04W 4/21* | (2018.01) |
| *H04W 12/00* | (2009.01) |

(52) U.S. Cl.
CPC .............. *H04L 9/30* (2013.01); *H04W 12/06* (2013.01); *H04L 63/0823* (2013.01); *H04L 63/18* (2013.01); *H04L 2209/80* (2013.01); *H04W 4/21* (2018.02); *H04W 12/00512* (2019.01); *H04W 84/18* (2013.01); *H04W 88/04* (2013.01)

(56) References Cited

U.S. PATENT DOCUMENTS

| | | | |
|---|---|---|---|
| 2002/0136401 | A1 | 9/2002 | Hoffstein et al. |
| 2003/0177361 | A1* | 9/2003 | Wheeler ............... G06F 21/32 713/176 |
| 2004/0064693 | A1* | 4/2004 | Pabla .................... H04L 63/02 713/168 |
| 2006/0020811 | A1 | 1/2006 | Skomra et al. |
| 2009/0280905 | A1 | 11/2009 | Weisman et al. |
| 2014/0079217 | A1 | 3/2014 | Bai et al. |
| 2014/0089670 | A1 | 3/2014 | Maletsky et al. |
| 2014/0157392 | A1 | 6/2014 | Smith et al. |
| 2014/0244834 | A1 | 8/2014 | Guedalia et al. |
| 2014/0357295 | A1 | 12/2014 | Tan |
| 2015/0304851 | A1* | 10/2015 | Chen ..................... H04W 4/80 713/172 |

OTHER PUBLICATIONS

Examination report for corresponding Swedish application No. 1550357-6 dated Nov. 6, 2015, all enclosed pages cited.
International Search Report and Written Opinion of PCT/SE2016/050243 dated May 2, 2016, all enclosed pages cited.
Extended Search Report and Written Opinion from corresponding European application No. 16769175.7 dated Nov. 28, 2018, all enclosed pages cited.

* cited by examiner

ASSET AUTHENTICATION IN A DYNAMIC, PROXIMITY-BASED NETWORK OF COMMUNICATION DEVICES

TECHNICAL FIELD

The present invention generally relates to the field of dynamic, proximity-based networks of communication devices. More specifically, the invention relates to a method of authenticating an asset in a dynamic, proximity-based network of communication devices, where the communication devices comprise a first communication interface for establishing the dynamic, proximity-based network by short-range wireless beacon broadcast messaging, and a second communication interface for communicating with a server by broadband communication. The invention also relates to associated communication devices and to a server.

BACKGROUND

Mobile terminals, such as smartphones and tablets, are common examples of communication devices which have become immensely well spread in the human society. As a result, certain needs have arisen. For instance, it is desired for users of communication devices to interact with other users in the neighborhood, preferably in a manner which is quick and convenient, yet controllable by the respective user. The present applicant and the present inventor have taken leadership in developing a new technology which considerably facilitates for users of communication devices which are proximate to each other to interact by, for instance, sharing content or conducting social media interaction.

The technology, which can be referred to as a "bubble" concept, is based on short-range wireless beacon broadcast messaging for establishing a dynamic, proximity-based network. Interaction between the users of the communication devices in the network is supported by broadband communication with a server. Details are disclosed in the Swedish patent applications SE 1451203-2 "COMMUNICATION DEVICE FOR IMPROVED SHARING OF CONTENT", SE 1400535-9 "SELECTIVE USER INTERACTION IN A DYNAMIC, PROXIMITY-BASED GROUP OF WIRELESS COMMUNICATION DEVICES" and SE 1451433-5 "DYNAMIC TIMING FOR IMPROVED COMMUNICATION HANDLING BETWEEN COMMUNICATION DEVICES", the contents of which are incorporated herein in their entirety.

Other types of dynamic, proximity-based networks of communication devices may also exist.

The present inventor has identified potential needs for reliability in dynamic, proximity-based networks, due to the inherent unpredictable nature of communication devices and their users in dynamic, proximity-based networks. It may be desired to prevent or at least reduce the risk of fraudulent behavior in the dynamic, proximity-based network, for instance by a malicious user not being who he or she pretends to be. Also, it may be desired to prevent or at least reduce the risk of manipulating identities of communication devices or their users in the dynamic, proximity-based network, for instance when the network is being established. The fact that the network establishment is based on short-range wireless beacon broadcast messaging poses a challenge in this regard due to the inherently limited bandwidth, reach and messaging sizes.

The present inventor has also identified that similar concerns may apply when one or more of the communication devices in the dynamic, proximity-based network are IoT (Internet of Things) devices rather than devices for use by human users.

SUMMARY

It is accordingly an object of the invention to offer improvements in the technical field of dynamic, proximity-based networks of communication devices, and to eliminate, alleviate, mitigate or reduce at least some of the problems referred to above.

One aspect of the present invention therefore is a method of authenticating an asset in a dynamic, proximity-based network of communication devices, where the communication devices comprise a first communication interface for establishing the dynamic, proximity-based network by short-range wireless beacon broadcast messaging, and a second communication interface for communicating with a server by broadband communication. The method involves:

a first communication device sending an authentication request to a second communication device via the first communication interface, said asset being associated with the second communication device;

the second communication device receiving the authentication request via the first communication interface and in response communicating with the server via the second communication interface to generate a digital signature by encrypting data which includes said asset with a private key for the second communication device;

the second communication device sending a signing completed report message about the generation of the digital signature to the first communication device via the first communication interface; and the first communication device receiving the signing completed report message via the first communication interface and in response communicating with the server via the second communication interface to retrieve an authentication result.

Another aspect of the present invention is a first wireless communication device comprising a first communication interface for establishing a dynamic, proximity-based network by short-range wireless beacon broadcast messaging, and a second communication interface for communicating with a server by broadband communication. The first wireless communication device is configured to:

send an authentication request to a second communication device via the first communication interface, the authentication request pertaining to an asset being associated with the second communication device;

receive a signing completed report message from the second communication device via the first communication interface; and, in response, communicate with the server via the second communication interface to retrieve an authentication result.

Still another aspect of the present invention is a second wireless communication device comprising a first communication interface for establishing a dynamic, proximity-based network by short-range wireless beacon broadcast messaging, and a second communication interface for communicating with a server by broadband communication. The second wireless communication device is configured to:

receive an authentication request via the first communication interface from a first communication device, the authentication request pertaining to an asset being associated with the second communication device;

in response, communicate with the server via the second communication interface to generate a digital signature by encrypting data which includes said asset with a private key for the second communication device; and send a signing completed report message about the generation of the digital signature to the first communication device via the first communication interface.

Yet another aspect of the present invention is a server for use with the first wireless communication device as defined above and the second wireless communication device as defined above. The server is configured to:

communicate with the second communication device via the second communication interface to generate the digital signature by encrypting data which includes said asset with the private key for the second communication device; and communicate with the first communication device via the second communication interface to retrieve the authentication result.

Other aspects, objectives, features and advantages of the disclosed embodiments will appear from the following detailed disclosure, from the attached dependent claims as well as from the drawings. Generally, all terms used in the claims are to be interpreted according to their ordinary meaning in the technical field, unless explicitly defined otherwise herein.

All references to "a/an/the [element, device, component, means, step, etc]" are to be interpreted openly as referring to at least one instance of the element, device, component, means, step, etc., unless explicitly stated otherwise. The steps of any method disclosed herein do not have to be performed in the exact order disclosed, unless explicitly stated.

DETAILED DESCRIPTION

The disclosed embodiments will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout.

Figure 1A:
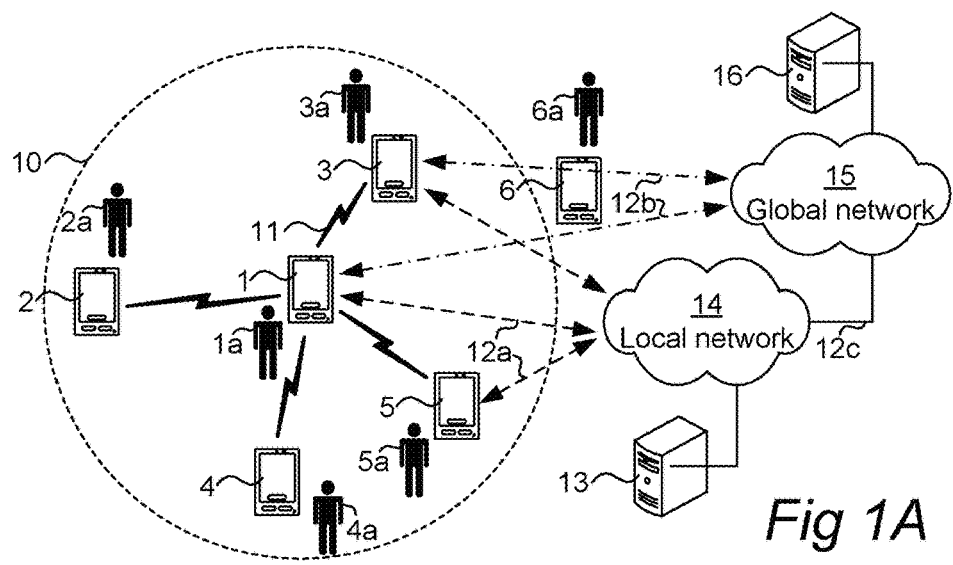
FIGS. 1A, 1B and 1C generally illustrate the bubble concept being based on a dynamic, proximity-based network of communication devices on a conceptual level.
Figure 1B:
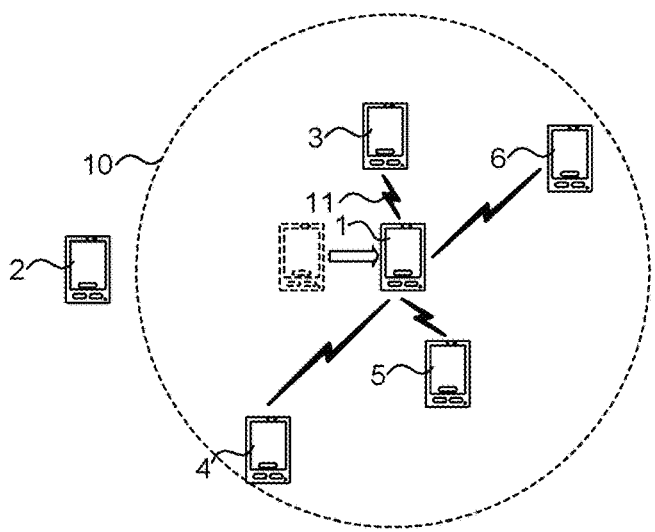
Figure 1C:
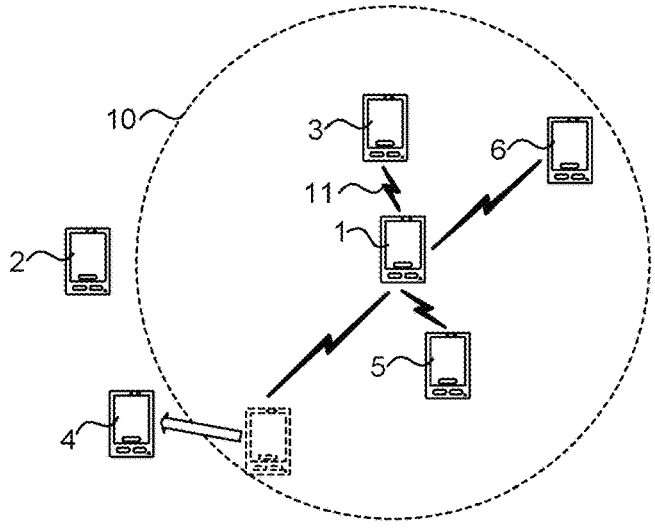

FIGS. 1A-1C generally illustrate a dynamic, proximity-based network of communication devices, and a concept also referred to as a "bubble". A plurality of communication devices 1-6 is seen in FIGS. 1A-1C. Each communication device may typically be a mobile telecommunications terminal such as a mobile phone (e.g. smartphone), a tablet computer (e.g. surfpad), a personal digital assistant, a laptop computer, a game console, etc. The communication devices 1-6 have respective users 1a-6a, as seen in FIG. 1A. Each communication device is typically portable, but at least some of them could alternatively be stationary, for instance desktop computers, computer integrated displays or IoT devices. If any of the communication devices 1-6 is an IoT device, it may lack a specific user 1a-6a.

The communication devices 1-6 can communicate with one or more servers 13, 16 over a local communication network 14 (see dashed arrows 12a), and/or a global communication network 15 (see dashed-dotted arrows 12b), and/or over both of the networks (see solid line 12c). The local communication network 14 may for instance be a wireless local area (WLAN) network compliant with IEEE 802.11 (WiFi), and the global communication network 15 may for instance be a cellular telecommunication network compliant with W-CDMA/HSPA, GSM, UMTS or LTE, supporting for instance TCP/IP based communication. Exemplifying embodiments of a communication device will be described in more detail later with reference to FIGS. 8A, 8B and 9. In an alternative embodiment, one or more of the servers 13, 16 may be implemented wholly or partly as a functional unit in any of the communication devices 1-6.

The bubble concept will now first be explained with reference to FIGS. 1A-1C. Then, features concerning authentication and secure identification in a bubble will be described with reference to FIGS. 2-6 on a general level. Following this, different exemplifying embodiments will be described with reference to FIGS. 7A-7C.

As seen in FIG. 1A, a first communication device 1 has a proximity zone 10 within which it can reach, and can be reached by, other communication devices 2, 3, 4 and 5 by way of short-range wireless beacon broadcast messages 11. Communication devices which are too far away from the first communication device 1, including communication device 6 in FIG. 1A, are currently not reachable by short-range wireless beacon broadcast messages 11 and are hence currently outside of the proximity zone 10.

A dynamic, proximity-based network may be established in the following way. A short-range wireless beacon broadcast message is sent by the first communication device 1 and is received by the other communication devices 2, 3, 4 and 5 in the proximity zone 10 of the first communication device. The communication device 6 is outside of the proximity zone 10 and will therefore not be able to receive the short-range wireless beacon broadcast message. The short-range wireless beacon broadcast message is adapted for requesting the receiving other communication devices 2, 3, 4 and 5 to react by sending a response message. In the disclosed embodiment, the short-range wireless beacon broadcast message is an iBeacon® message (in turn being based on Bluetooth Low Energy (BLE)). The short-range wireless beacon broadcast message therefore contains a universally unique identifier (UUID) associated with the first communication device 1. Other embodiments may be based on BLE directly, or on any other short-range wireless communication standard capable of transmitting beacon messages.

In the disclosed embodiment, the receiving other communication device 2, 3, 4, 5 may react by sending a response message to the server 13 or 16 over the local communication network 14 and/or the global communication network 15. However, situations are foreseeable where not all of the receiving other communication devices 2, 3, 4, 5 will react in this way. For instance, in some embodiments, only those receiving other communication devices 2, 3, 4, 5 which contain certain software functionality on an application level (e.g. a "bubble app"), application framework level (e.g. a "bubble plug-in") or operating system level (e.g. a "bubble driver"), will be capable or admitted to respond to the short-range wireless beacon broadcast message from the first communication device 1.

The response message contains information which identifies the responding other communication device (for instance an UUID associated therewith, or alternatively an IP address, a MAC address, etc). The response message also contains information which identifies the first communication device 1 (typically the UUID contained in the received short-range wireless beacon broadcast message).

The server 13 or 16 registers the responding devices among the other communication devices 2, 3, 4, 5. The server 13 or 16 now has a mapping between the identity of the first communication device 1 and the identities of the registered responding other devices. In effect, it contains sufficient information to define the current bubble for the first communication device 1, since there is typically a one-to-one relation between an identity of one of the other devices and its respective user.

Such relations between user identity and device identity may be represented in different ways. For instance, when installing a "bubble app" in their communication devices, the users may register themselves with the server 13 or 16, wherein the server 13 or 16 may allocate or register a user ID and store it together with the identity of the corresponding communication device. Alternatively, a user ID may be included in the response message from the responding communication device.

Alternatively, the other communication devices 2, 3, 4, 5, which receive the short-range wireless beacon broadcast message sent from the first communication device 1, may react by sending a response message back to the first communication device 1. The first communication device 1 will register the responding devices among the other communication devices. Again, the first communication device 1 will now have a mapping between its own identity and the identities of the registered responding other devices, and therefore sufficient information to define the current bubble for the first communication device 1. As already explained above, there is typically a one-to-one relation between an identity of one of the other devices and its respective user.

From the perspective of the user 1a of the first communication device 1, the users 2a, 3a, 4a and 5a of the communication devices 2, 3, 4 and 5 are currently available for interaction, provided that they have been duly registered as respondents of the short-range wireless beacon broadcast message, as described above. The users 2a, 3a, 4a and 5a are therefore members of a bubble around the first communication device 1.

Interaction with users in the bubble may, for instance, involve sharing of content which may be created and/or stored locally in the communication device, or retrieved to or transmitted from the communication device using the local communication network 14 and/or the global communication network 15. Non-limiting examples of content include pictures, videos, audio files, messages, texts, or social media profiles. Other kinds of interaction may include social media interaction (such as invitations/friending/connecting), telephone call, short text messaging, multimedia messaging, email messaging, chat conversation, etc Moreover, functionality for identifying, counting and/or categorizing the other users which are currently in a user's bubble may be provided. Interaction may be made with all current users of the bubble, for instance by offering a certain content for sharing among all current users of the bubble, or interaction may be made selectively with one or more—as distinct from all—of the other users currently in the bubble. This can be seen as segmentation of a user's bubble.

Details of the bubble technology are given in the aforementioned Swedish patent applications as listed in the Background section; it is recalled that the contents thereof are incorporated herein in their entirety.

The situation in FIG. 1A is an exemplifying temporal snapshot; the bubble for the user 1a of the first communication device 1 consists, at that particular moment in time, of the users 2a, 3a, 4a and 5a. The situation may change at any time, for instance when any of the communication device 1-6 moves. Hence, the bubble may be updated at any time. The functionality of the first communication device 1 of sending a short-range wireless beacon broadcast message to other communication devices in the current proximity zone 10 around the first communication device 1 may be repeated according to a predetermined schedule or upon request by the user of the first communication device 1, so as to update the dynamic, proximity-based network of communication devices for the first communication device 1.

A first example of such an update is seen in FIG. 1B. Here, the first communication device 1 has moved with respect to the other communication devices 2-6. As a result, the proximity zone 10 moves with the first communication device 1. In FIG. 1B, this causes two changes. First, the communication device 2 is now positioned outside of the proximity zone 10; therefore the user 2a will disappear from the bubble for user 1a. Second, the communication device 6 will now be positioned inside of the proximity zone 10; therefore the user 6a will enter the bubble for user 1A. The bubble for user 1a in FIG. 1B will thus consist of users 3a, 4a, 5a and 6a, and the dynamic, proximity-based network will comprise the communication devices 1, 3, 4, 5 and 6.

A second example of a bubble change for user 1a is seen in FIG. 1C. Here, the communication device 4 has moved away from the first communication device 1 (and the other communication devices 3, 5 and 6). As a result, the communication device 4 is now positioned outside of the proximity zone 10; therefore the user 4a will disappear from the bubble for user 1a. The bubble for user 1a in FIG. 1C will thus consist of users 3a, 5a and 6a, and the dynamic, proximity-based network will comprise the communication devices 1, 3, 5 and 6.

Figure 2:
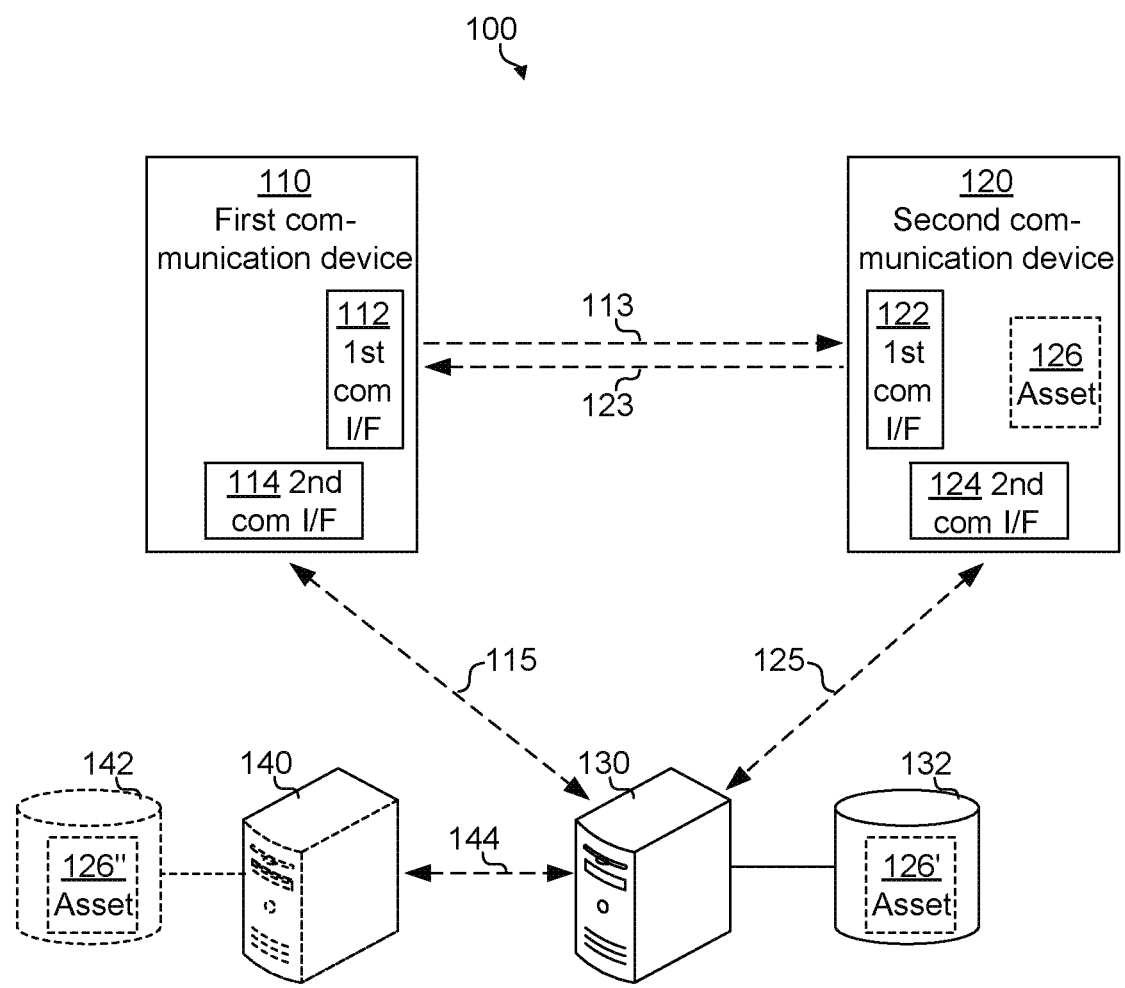
FIG. 2 illustrates a dynamic, proximity-based network of communication devices according to one embodiment.

Reference is now made to FIG. 2 which illustrates a dynamic, proximity-based network 100 of communication devices according to one embodiment. The dynamic, proximity-based network 100 may, for instance, be established as described above for FIGS. 1A-1C, or in the manner which will be described later with reference to FIGS. 7A-7C.

The dynamic, proximity-based network 100 in FIG. 2 comprises a first communication device 110 and a second communication device 120. In reality, the network 100 may also comprise third, fourth, fifth communication devices, etc. The first and second communication devices 110, 120 may, for instance, be any of the communication devices 1-6 as referred to above for FIGS. 1A-1C.

Each of the first communication device 110 and second communication device 120 comprises a first communication interface 112 and 122, respectively, for establishing the dynamic, proximity-based network 100 by short-range wireless beacon broadcast messaging. The short-range wireless beacon broadcast messaging is typically unidirectional, as is seen at 113 and 123, respectively. Particulars of the first communication interface 112, 122 will be given later with reference to FIG. 9 (cf reference numeral 732 therein).

Moreover, each of the first communication device 110 and second communication device 120 comprises a second communication interface 114 and 124, respectively, for communicating with a server 130 by broadband communication. The broadband communication with the server 130 is typically bidirectional, as is seen at 115 and 125, respectively, and typically occurs at a substantially higher bandwidth than the short-range wireless beacon broadcast messaging 113 and 123. Particulars of the second communication interface 114, 124 will be given later with reference to FIG. 9 (cf reference numeral 734 therein).

The server 130 may, for instance, be any of the servers 13 and 16 referred to above for FIGS. 1A-1C. The server 130 may be a standalone computing resource external to the first and second communication devices 110, 120, a cloud-based (distributed) computing resource, or, in alternative embodiments, implemented in and by the first communication device 110.

The second communication device 120 is associated with an asset 126. The asset 126 may, for instance, be an identifier of the second communication device 120, or a user thereof. An example of such an identifier is referred to as UID2 in FIGS. 3-7C, which will be described in more detail later.

Alternatively, the asset 126 may be a user profile of a user of the second communication device. An example of such a user profile is referred to as U2_Profile in FIGS. 3-7C, which again will be described in more detail later.

As a further alternative, the asset 126 may be a valuable digital content which the second communication device 120, or the user thereof, is in control of. Examples of valuable digital content includes electronic or digital currency, electronic or digital tickets, electronic or digital tokens, electronic or digital certificates, electronic or digital passports, electronic or digital passbills, electronic or digital transaction accounts, etc.

Figure 9:
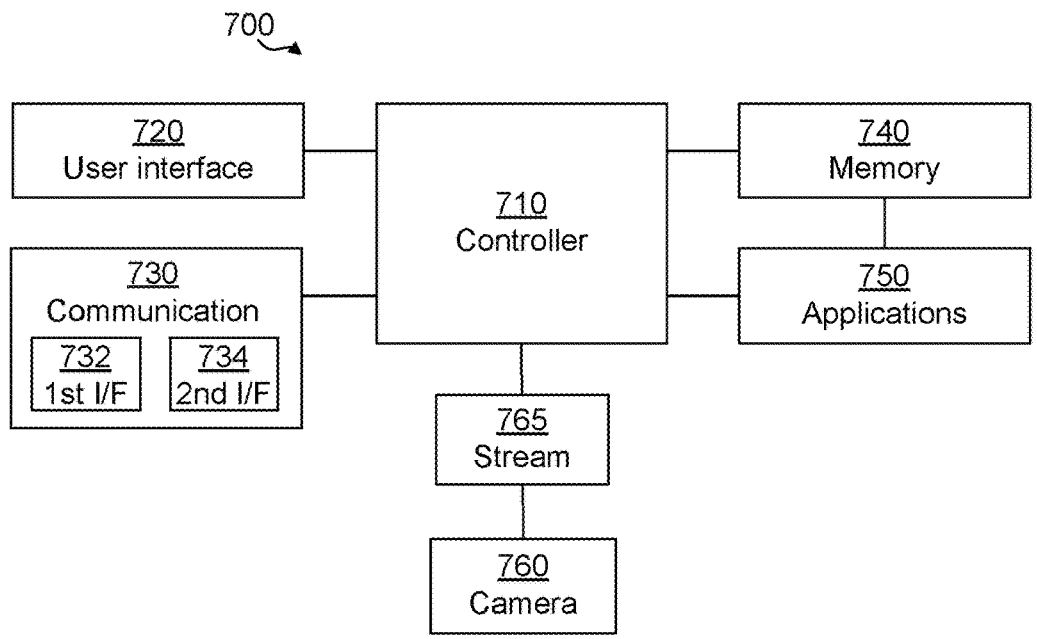
FIG. 9 is a schematic view of the components of the communication device in FIG. 8A or 8B.

The asset 126 may be stored in local memory of the second communication device 120 (cf reference numeral 740 in FIG. 9). Alternatively, the asset may be stored at the server 130, for instance in a data storage 132 thereof, as is seen at 126' in FIG. 2. The second communication device 120 may then store a link to the asset 126', or the server 130 may associate the asset 126' with the second communication device 120 in another way, for instance by storing an identifier of the second communication device 120 or its user in the data storage 132 together with the asset 126'.

As a further alternative, and as seen at 126", the asset may be stored remotely at a third party, which can be seen for a second server 140 with a data storage 142 in FIG. 2. The second server 140 can communicate with the server 130, as is seen at 144 in FIG. 2. The remotely stored asset 126" may for instance be associated with the second communication device 120 in any of the ways given above.

The first communication device 110, or its user, may wish to authenticate the asset 126 of the second communication device 120 in different situations. For instance, when the first communication device 110 is a device, like communication device 1 in FIGS. 1A-1C, for which a bubble has been or shall be created, it may be desired to verify that the second communication device 120, or its user, is who it/he/she claims to be, before the second communication device 120 is admitted into the dynamic, proximity-based network 100, and/or before the user of the second communication device 120 is admitted into the bubble created by the user of the first communication device 110. In this exemplary situation, the asset 126 is typically the identifier of the second communication device 120 or the user thereof, and/or a user profile of the user of the second communication device 120.

A second exemplary situation is when the second communication device 120 appears on the dynamic, proximity-based network 100 and requests a service from the first communication device 110, or the user thereof, presenting the asset 126 as either a means for identification or a means for payment for the service.

Figure 3:
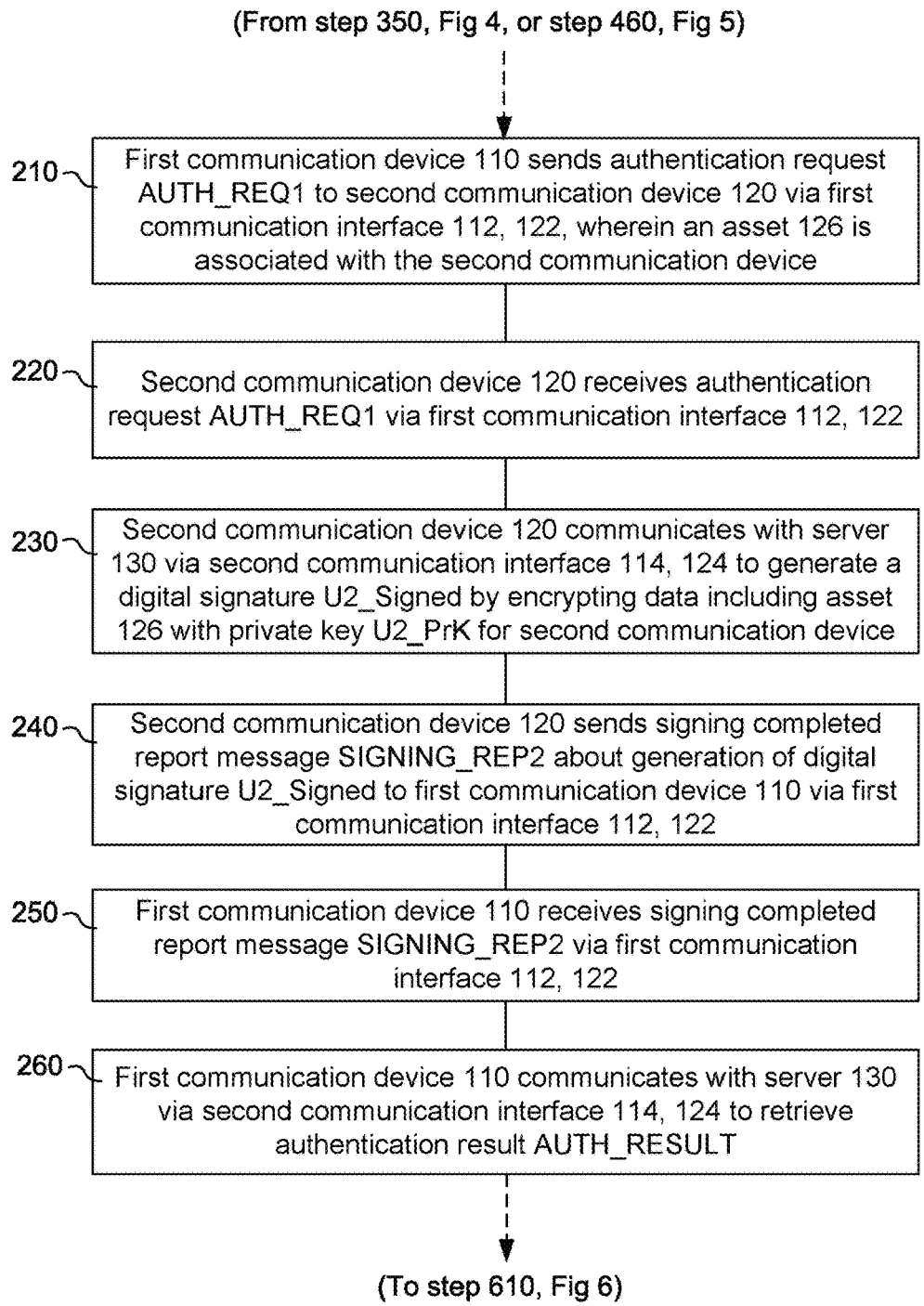
FIG. 3 is a schematic flowchart diagram of a method of authenticating an asset in a dynamic, proximity-based network of communication devices according to one embodiment.

To this end, FIG. 3 is a schematic flowchart diagram of a method of authenticating the asset 126 in the dynamic, proximity-based network 100 of FIG. 2 according to one embodiment. The functionality in FIG. 3 may be preceded by functionality for registration of the communication devices 110, 120 at the server 130, as will be described in more detail later with reference to FIG. 4. Additionally or alternatively, the functionality in FIG. 3 may be preceded by functionality for secure identification of the communication devices 110, 120, as will be described in more detail later with reference to FIG. 5.

Figure 7A:
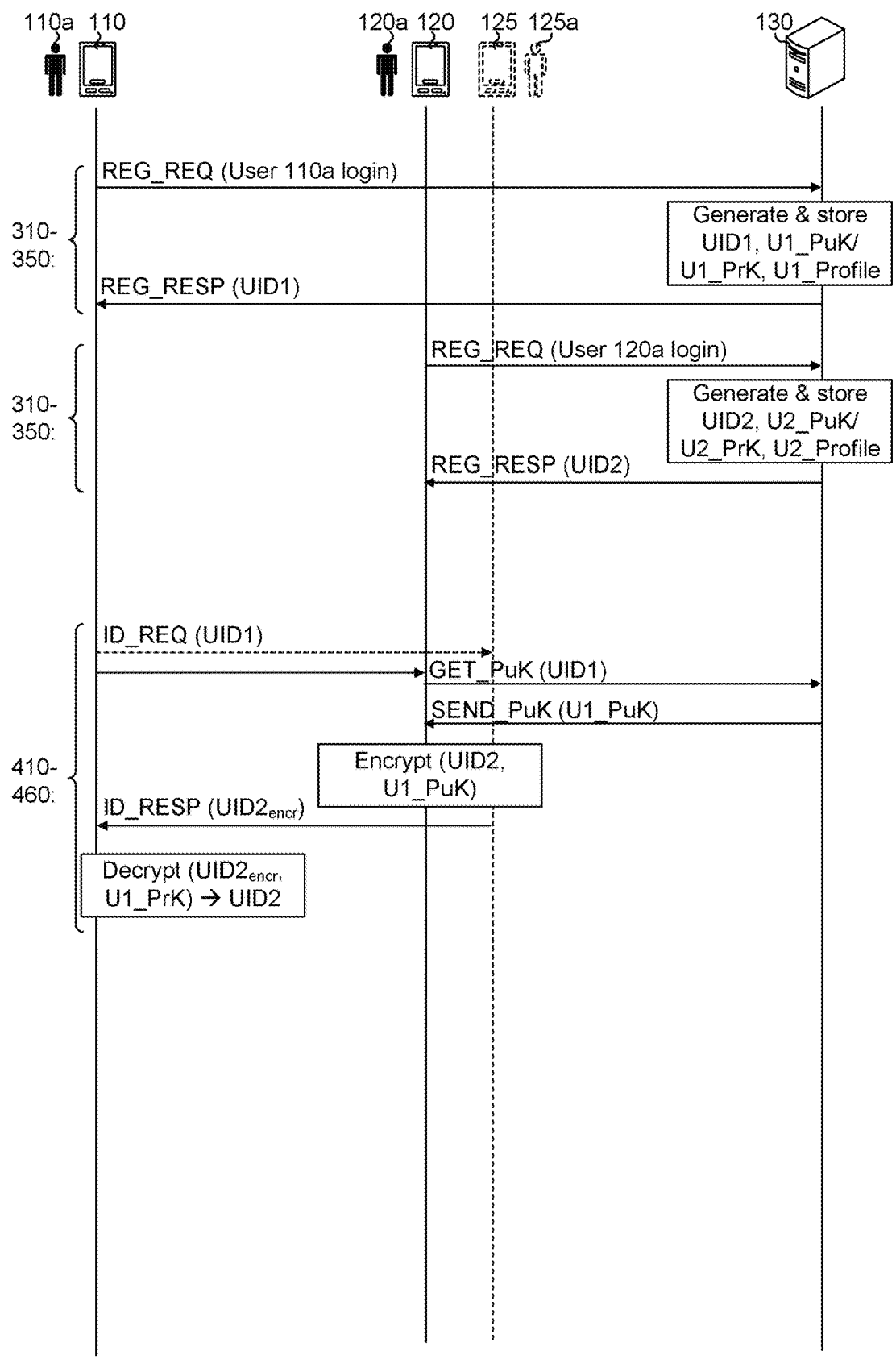
FIG. 7A is a schematic timeline diagram illustrating one possible implementation of the registration of communication devices at the server according to FIG. 4 and of the secure identification of communication devices according to FIG. 5.
Figure 7B:
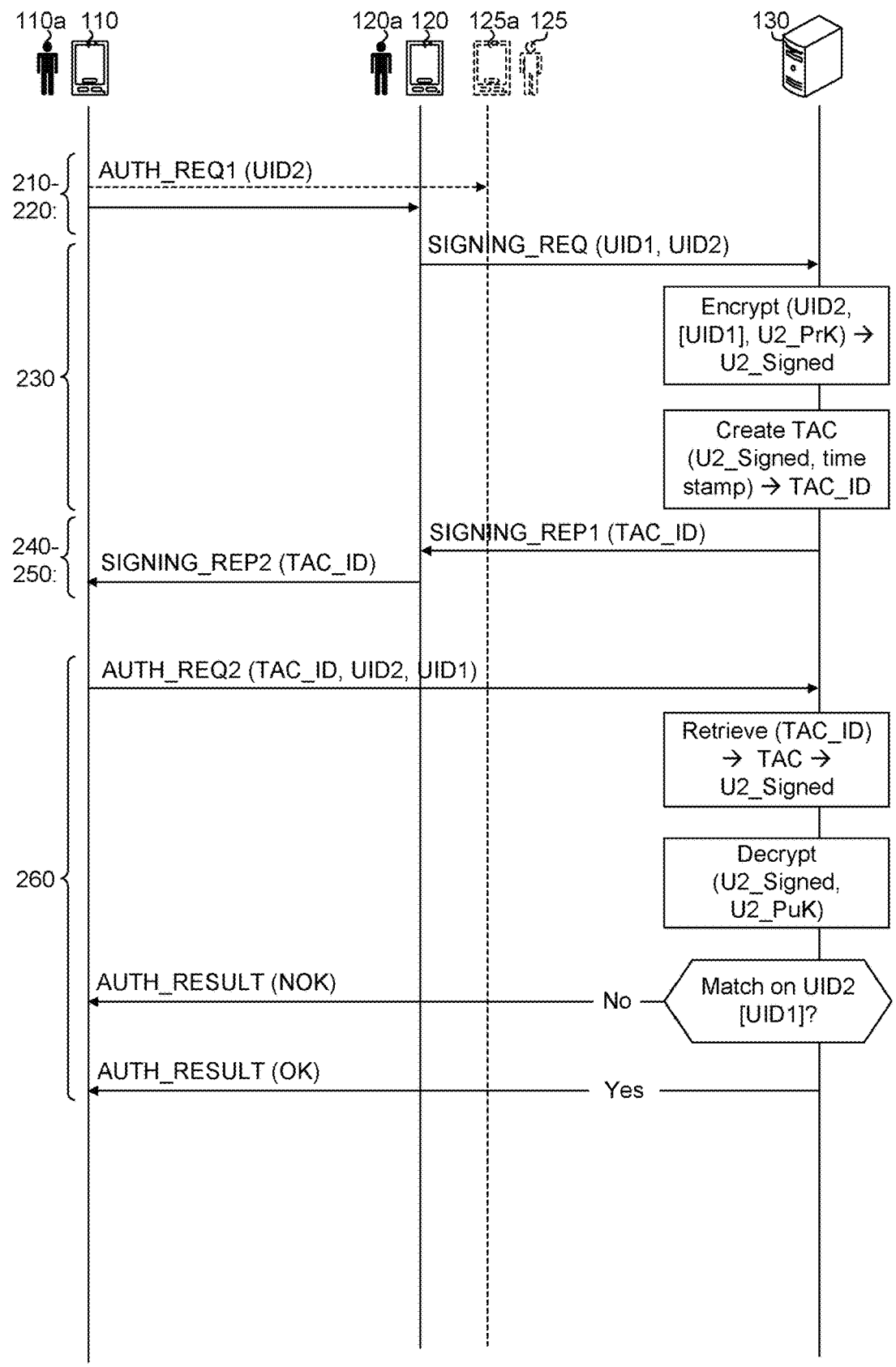
FIG. 7B is a schematic timeline diagram illustrating one possible implementation of the method of authenticating an asset in a dynamic, proximity-based network of communication devices according to FIG. 3.

FIG. 7B illustrates one possible implementation of the method of authenticating the asset 126 in the dynamic, proximity-based network 100 of communication devices 110, 120 according to FIG. 3. FIG. 3 and FIG. 7B will therefore be described concurrently in the following.

As seen in a first step 210 in FIG. 3, the first communication device 110 sends an authentication request to the second communication device 120 via the first communication interface 112, 122. As previously mentioned, the authentication request pertains to the asset 126 (126', 126") which is associated with the second communication device 120. In FIG. 7B, the authentication request in step 210 is implemented as a short-range wireless beacon broadcast message AUTH_REQ1, containing an identifier UID2 of the user 120a of the second communication device 120.

As seen in FIG. 7B, the AUTH_REQ1 message is broadcasted to all communication devices in the dynamic, proximity-based network 100, including a communication device 125. However, the inclusion of the identifier UID2 in the AUTH_REQ1 message will allow the second communication device 120 to determine that it is the intended receiver of the message.

Accordingly, the second communication device 120 will receive, in a step 220 of FIG. 3, the authentication request via the first communication interface 112, 122. In response, the second communication device 120 will communicate in a step 230 of FIG. 3 with the server 130 via the second communication interface 114, 124 to cause the server 130 to generate a digital signature U2_Signed by encrypting data which includes the asset 126 with a private key U2_PrK for the second communication device 120.

As seen in FIG. 7B, to trigger this activity, the second communication device 120 sends a SIGNING_REQ message over the second communication interface 114, 124 to the server 130. In the embodiment of FIG. 7B, the asset 126 is the identifier UID2 of the second communication device 120, and consequently the identifier UID2 is included in the SIGNING_ REQ message.

In response to receiving the SIGNING_ REQ message, the server 130 will retrieve a private key U2_PrK for the second communication device 120 and encrypt the identifier UID2 (constituting the asset 126) of the second communication device 120 to generate a digital signature U2_Signed. The generated digital signature U2_Signed will be stored in, at or for the server 130, i.e. the generated digital signature will not be transmitted to the second communication device 120, nor to the first communication device 110.

In an advantageous embodiment, as seen in the implementation according to FIG. 7B, the server 130 will create a temporary authentication context, TAC, which comprises the digital signature U2_Signed as well as, beneficially, a time stamp. An identifier TAC_ID will also be generated to represent the created temporary authentication context TAC. The TAC will be stored in a data storage accessible to the server 130, such as the data storage 132. Optionally, random data (a salt) may be appended to the data which includes the asset 126 (e.g. the UID2) prior to encryption, and may be included in the created and stored TAC.

Then, in a step 240 of FIG. 3, the second communication device 120 will send a signing completed report message about the generation of the digital signature U2_Signed to the first communication device 110 via the first communication interface (112, 122).

As seen in FIG. 7B, in the disclosed embodiment, this activity involves the server 130 sending a signing completed report SIGNING_REP1, containing the created TAC_ID, to the second communication device 120 over the second communication interface 114, 124. In response, the second communication device 120 will send a signing completed report message SIGNING_REP2, again containing the created TAC_ID, to the first communication device 110 over the first communication interface 112, 122.

In a step 250 of FIG. 3, the first communication device 110 will receive the signing completed report message (SIGNING_REP2) via the first communication interface (112, 122) and in response, in a step 260 of FIG. 3, communicate with the server 130 via the second communication interface 114, 124 to cause the server 130 to retrieve an authentication result. To retrieve the authentication result, the server 130 will use the generated digital signature U2_Signed as stored in, at or for the server 130, as has been described above.

As seen in FIG. 7B, in the disclosed embodiment, the activity of step 260 involves the first communication device 110 sending an authentication request AUTH_REQ2 to the server 130 via the second communication interface 114, 124. The authentication request AUTH_REQ2 contains the TAC_ID as received in step 250, as well as the UID2.

Upon receiving the authentication request AUTH_REQ2, the server 130 will use the TAC_ID contained therein to retrieve the stored temporary authentication context TAC. The server 130 may check the time stamp of the TAC against a current time to determine whether the TAC is still valid or has expired. From the retrieved TAC, the server 130 will retrieve the digital signature U2_Signed. The server 130 will retrieve a public key U2_PuK corresponding to the private key U2_PrK for the second communication device 120, as well as the stored random data (salt) if applicable, and decrypt U2_Signed to derive the identifier UID2 of the second communication device 120.

The server 130 will then determine if the derived identifier UID2 matches the identifier UID2 from in the authentication request AUTH_REQ2 from the first communication device 110. In case of a match, the server 130 considers the second communication device 120 as being authenticated, and in response sends an authentication result AUTH_RESULT with a positive value (e.g. OK) to the first communication device 110 via the second communication interface 114, 124.

On the other hand, if there is no match, the server 130 considers the second communication device 120 as not being authenticated, and in response it will send an authentication result AUTH_RESULT with a negative value (e.g. NOT OK, NOK) to the first communication device 110 via the second communication interface 114, 124.

Functionality for registration of the communication devices 110, 120 at the server 130 will now be described in more detail with reference to FIG. 4 and concurrently a possible implementation shown in FIG. 7A.

Figure 4:
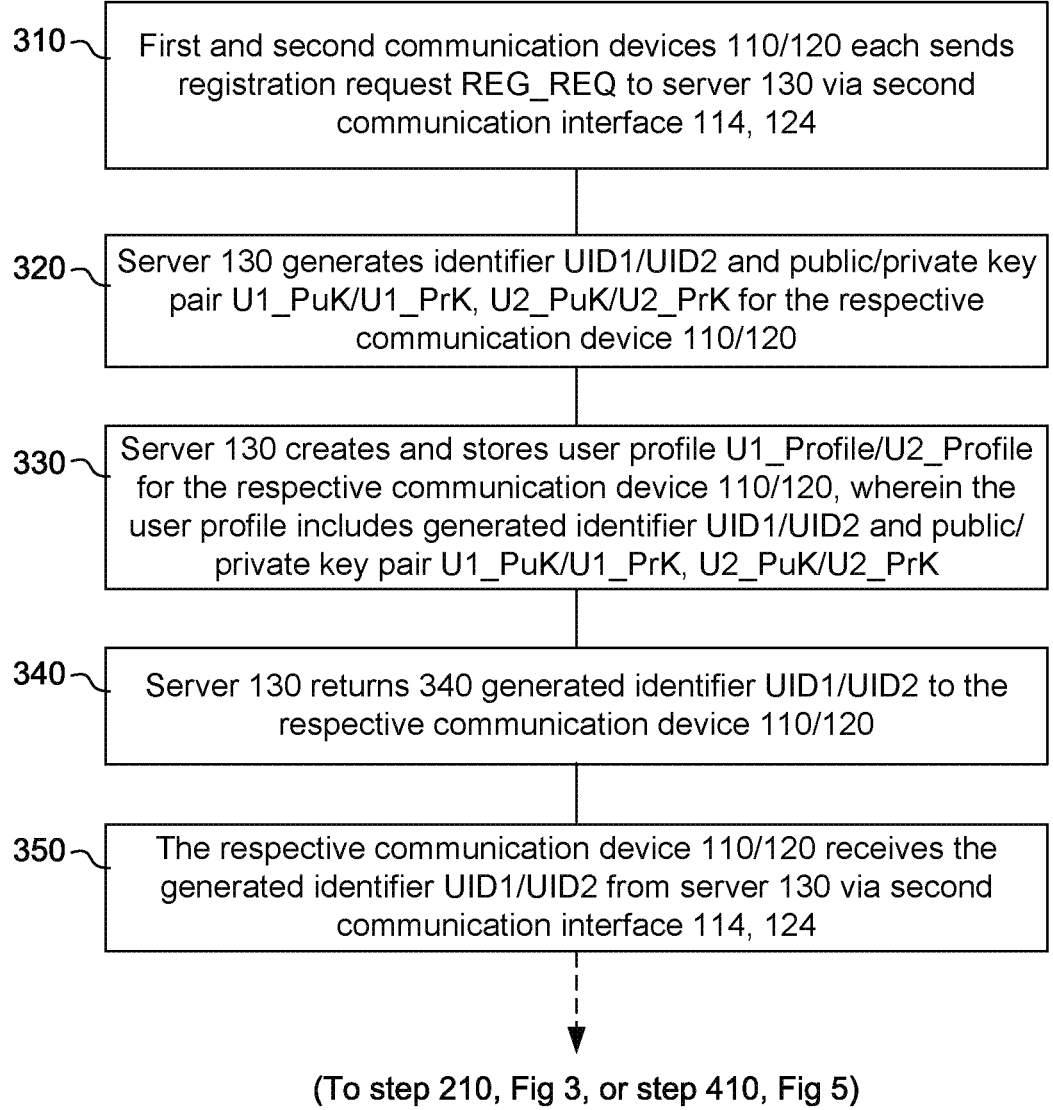
FIG. 4 schematically illustrates registration of communication devices at a server, the registration being an initial part of the method of authenticating an asset according to one embodiment.

In a first step 310 of FIG. 4, each of the first and second communication devices 110/120 initially sends a registration request REG_REQ to the server 130 via the second communication interface 114, 124. In response, the server 130 will generate the identifier UID1/UID2 and the public/private key pair U1_PuK/U1_PrK, U2_PuK/U2_PrK for the respective communication device 110/120 in a step 320.

In a step 330, the server 130 will create a user profile U1_Profile/U2_Profile for the respective communication device 110/120. The user profile will include the generated identifier UID1/UID2 and public/private key pair U1_PuK/U1_PrK, U2_PuK/U2_PrK. The created user profile U1_Profile/U2_Profile will be stored in a data storage accessible to the server 130, such as the data storage 132. The identifier UID2 and the public/private key pair U2_PuK/U2_PrK will therefore be conveniently accessible to the server 130 for any subsequent authentication of the second communication device 120, as described above with respect to FIG. 3 and FIG. 7B.

Then, in a step 340 in FIG. 4, the server 130 will return the generated identifier UID1/UID2 to the respective communication device 110/120 by sending a respective REG_RESP message via the second communication interface 114, 124.

The respective communication device 110/120 will receive the generated identifier UID1/UID2 from the server 130 via the second communication interface 114, 124 in a final step 350 in FIG. 4.

Functionality for secure identification of the communication devices 110, 120 will now be described in more detail with reference to FIG. 5 concurrently with a possible implementation shown in FIG. 7A. In the situation in FIG. 5 and FIG. 7A, it is assumed that the first communication device 110, or its user 110*a*, wishes to securely identify other communication devices in the network 100, including the second communication device 120, or its user 120*a*.

Figure 5:
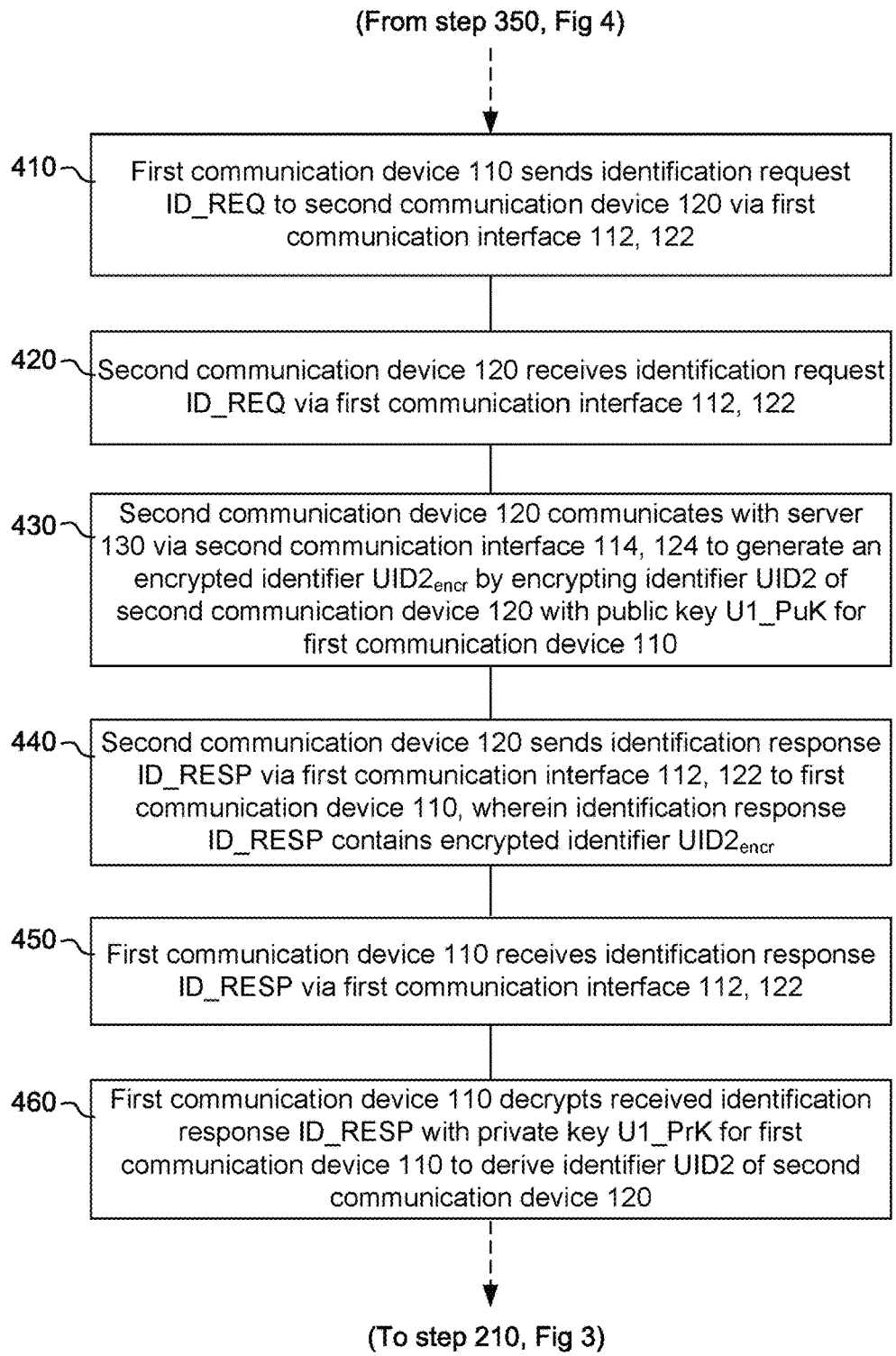
FIG. 5 schematically illustrates secure identification of communication devices, the secure identification being an initial part of the method of authenticating an asset according to one embodiment.

In a first step 410 of FIG. 5, therefore, the first communication device 110 sends an identification request to the second communication device 120 via the first communication interface 112, 122. As seen in FIG. 7A, the identification request ID_REQ contains the identifier UID1 of the first communication device 110 (conveniently generated when the first communication device 110 registered with the server 130 as described above for FIG. 4), and is broadcasted via the first communication interface 112, 122 to all communication devices in the dynamic, proximity-based network 100, including the second communication device 120 and the other communication device 125.

In a second step 420 of FIG. 4, the second communication device 120 receives the identification request, ID_REQ, via the first communication interface 112, 122. In response, the second communication device 120 communicates in a third step 430 with the server 130 via the second communication interface 114, 124 to generate an encrypted identifier UID2$_{encr}$ by encrypting the identifier UID2 of the second communication device 120 with the public key U1_PuK for the first communication device 110.

The activity of steps 420 and 430 involve the second communication device 120 sending a GET_PuK message to the server 130, the GET_PuK message containing the identifier UID1 of the requesting first communication device 110. The server 130 will retrieve the public key U1_PuK for the first communication device 110, which is conveniently available in the user profile U1_Profile for the user 110a of the first communication device 110, as described above for FIG. 4. The server 130 will then send the retrieved public key U1_PuK for the first communication device 110 in a SEND_PuK message to the second communication device 120 via the second communication interface 114, 124.

Upon receipt of the SEND_PuK message from the server 130, the second communication device 120 will encrypt its identifier UID2 with the retrieved public key U1_PuK for the first communication device 110 to produce the encrypted identifier UID2$_{encr}$. Alternatively, the server 130 may perform the encryption and send the encrypted identifier UID2$_{encr}$ in the SEND_PuK message to the second communication device 120.

The second communication device 120 will then send, in a fourth step 440 of FIG. 4, an identification response ID_RESP via the first communication interface 112, 122 to the first communication device 110. The identification response ID_RESP will contain the encrypted identifier UID2$_{encr}$ of the second communication device 120.

Upon receipt of the identification response ID_RESP via the first communication interface 112, 122 from the second communication device 120 in a fifth step 450 in FIG. 4, the first communication device 110 will decrypt the encrypted identifier UID2$_{encr}$ in a sixth step 460 in FIG. 4, using its private key U1_PrK. To this end, the private key U1_PrK may have been distributed from the server 130 to the first communication device 110 in a safe manner after registration with the server 130 and creation of the user profile U1_Profile.

The decryption of the encrypted identifier UID2$_{encr}$ in step 460 of FIG. 4 will make the identifier UID2 of the second communication device 120 securely available to the first communication device 110. This may be beneficial for instance if the user 110a of the first communication device 110 intends to admit the user 120a of the second communication device 120 into his or her bubble. Also, the first communication device 110 may use the secure identification functionality of FIG. 4 and FIG. 7A as a safe discovery method to find other communication devices 120, 125 in the dynamic, proximity-based network 100.

Even better security is of course obtained when the user 110a of the first communication device 110 uses also the authentication functionality as described above with reference to FIG. 3 and FIG. 7B. To this end, the additional functionality disclosed in FIG. 6, as possibly implemented according to FIG. 7C, may be employed.

Figure 6:
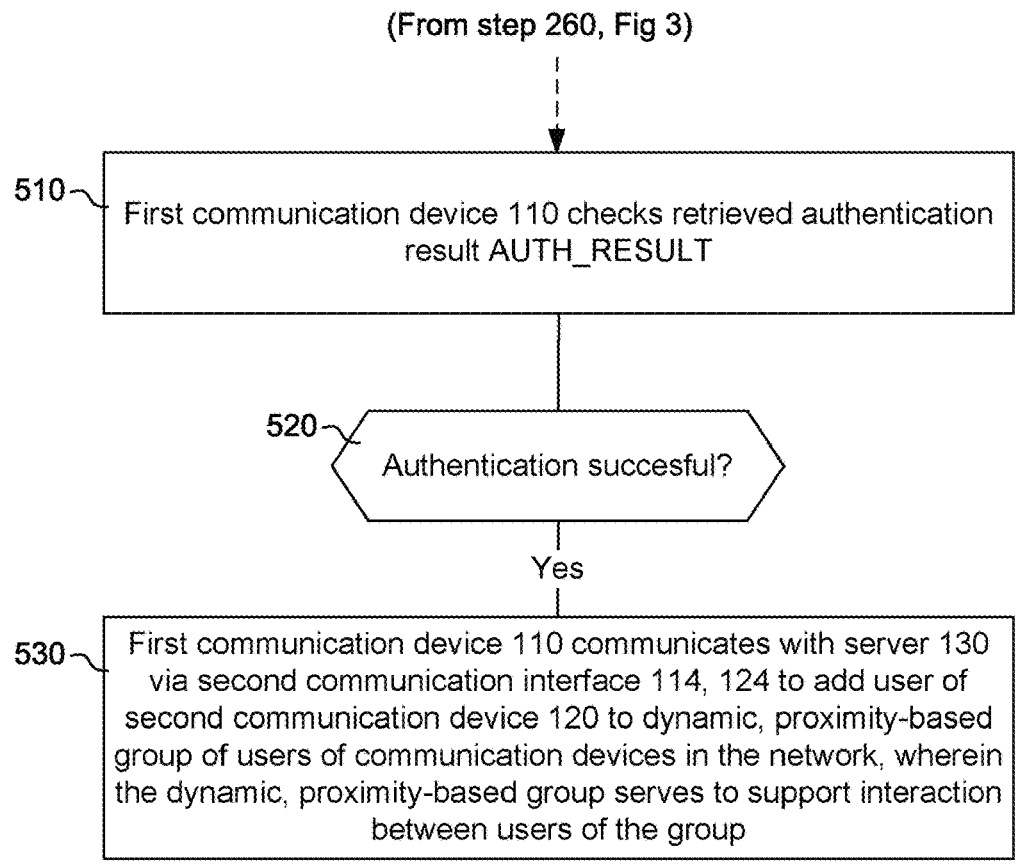
FIG. 6 schematically illustrates adding an authenticated user to a bubble, as a result of successful authentication by the method shown in FIG. 3, according to one embodiment.

A first step 510 of FIG. 6 occurs after the concluding step 260 of FIG. 3. In step 510, the first communication device 110 checks the retrieved authentication result AUTH_RESULT. In step 520, if the authentication of the second communication device 120 is found to have been successful (i.e., the retrieved authentication result AUTH_RESULT=OK), the first communication device 110 communicates with the server 130 via the second communication interface 114, 124 in a step 530 to add the user 120a of the second communication device 120 to a dynamic, proximity-based group of users of communication devices in the network—i.e. the bubble of the user 110a of the first communication device 110. As previously explained, the dynamic, proximity-based group will support interaction between users of the group.

Figure 7C:
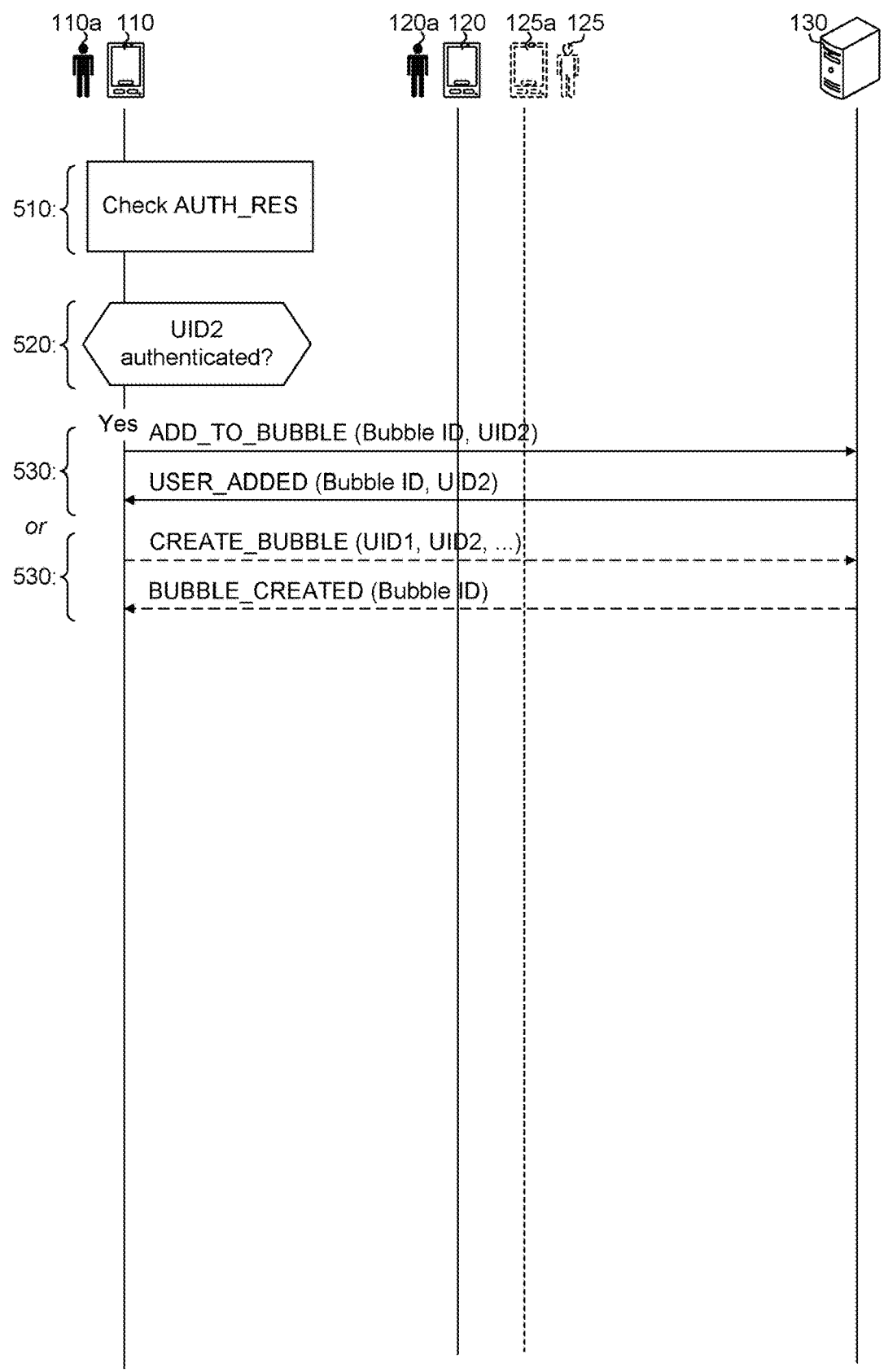
FIG. 7C is a schematic timeline diagram illustrating one possible implementation of the adding of an authenticated user to a bubble according to FIG. 6.

In the implementation shown in FIG. 7C, this activity may involve the first communication device 110 sending an ADD_TO_BUBBLE message to the server 130 via the second communication interface 114, 124. The ADD_TO_BUBBLE message serves to add a new user (in this case user 120a of the second communication device 120) to an existing bubble as identified by a bubble identifier Bubble ID. The new bubble user 120a is identified by the identifier UID2. The server 130 will acknowledge addition of the new bubble user 120a by sending a USER_ADDED confirmation to the first communication device 110 via the second communication interface 114, 124.

Alternatively, the first communication device 110 may send a CREATE_BUBBLE message to the server 130 via the second communication interface 114, 124. The CREATE_BUBBLE message will serve to create a bubble on behalf of the user 110a of the first communication device 110; hence the CREATE_BUBBLE message may contain a list of identifiers of users to become members of the new bubble. The list of identifiers may contain the identifier UID1 of the user 110a of the first communication device 110, the identifier UID2 of the user 120a of the second communication device 120, as well as other users if applicable. The server 130 will acknowledge creation of the new bubble by sending a BUBBLE_CREATED confirmation to the first communication device 110 via the second communication interface 114, 124, wherein the BUBBLE_CREATED confirmation may contain a Bubble ID for the new bubble.

Figure 8A:
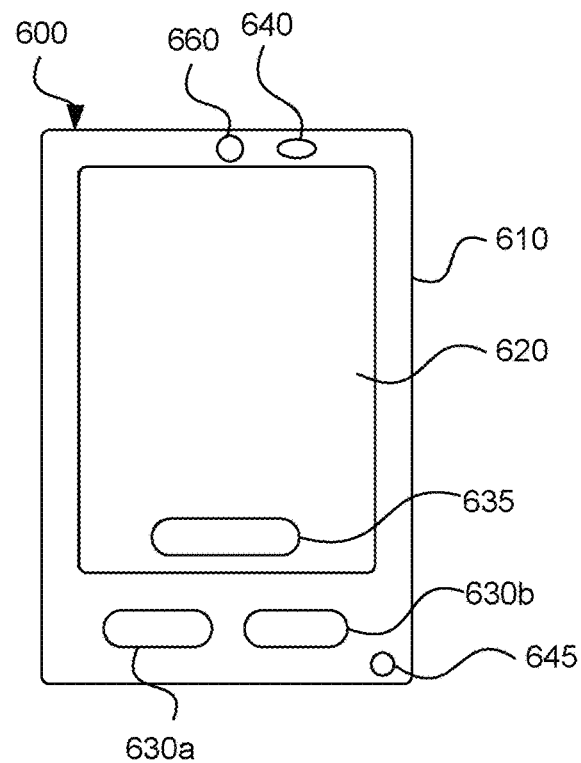
FIGS. 8A and 8B are schematic views of a communication device according to two respective embodiments.
Figure 8B:
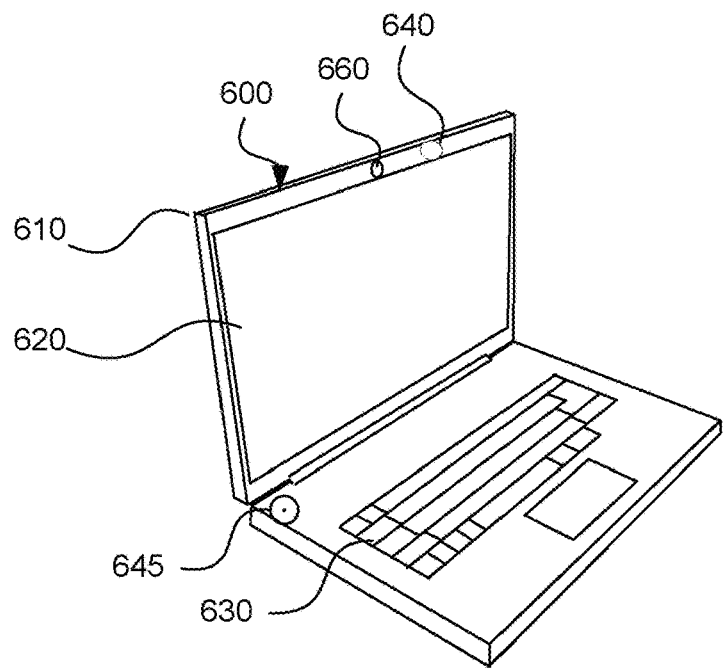

FIGS. 8A and 8B generally show a wireless communication device 600 which may implement any of the communication devices 1-6, 110 and 120 referred to above. Referring to FIG. 8A, the wireless communication device is a mobile telecommunications terminal in the form of a smartphone or a tablet computer (arranged with a wireless communication interface), comprising a housing 610 in which a display 620 is arranged. In one embodiment the display 620 is a touch display. In other embodiments the display 620 is a non-touch display. Furthermore, the smartphone 600 comprises two keys 630a, 630b. In this embodiment there are two keys 630, but any number of keys is possible and depends on the design of the smartphone 600.

In one embodiment the smartphone 600 is configured to display and operate a virtual key 635 on the touch display 620. It should be noted that the number of virtual keys 635 depends on the design of the smartphone 600 and an application that is executed on the smartphone 600. The smartphone 600 may also be equipped with a camera 660. The camera 660 may be a digital camera that is arranged to take video or still photographs by recording images on an electronic image sensor (not shown). In one embodiment the camera 660 may be an external camera. In one embodiment the camera may alternatively be replaced by a source providing an image stream. The smartphone 600 may also be equipped with a loudspeaker 640 and a microphone 645.

Referring to FIG. 8B, a laptop computer 600 comprises a display 620 and a housing 610. The housing comprises a controller or CPU (not shown) and one or more computer-readable storage media (not shown), such as storage units and internal memory. Examples of storage units are disk drives or hard drives. The laptop computer 600 further comprises at least one data port. Data ports can be wired and/or wireless. Examples of data ports are USB (Universal Serial Bus) ports, Ethernet ports or WiFi (according to IEEE standard 802.11) ports. Data ports are configured to enable the laptop computer 600 to connect with other computing devices or a server.

The laptop computer 600 further comprises at least one input unit such as a keyboard 630. Other examples of input units are computer mice, touch pads, touch screens or joysticks, to name a few.

The laptop computer 600 may further be equipped with a camera 660. The camera 660 may be a digital camera that is arranged to take video or still photographs by recording images on an electronic image sensor (not shown). In one embodiment the camera 660 may be an external camera. In one embodiment the camera may alternatively be replaced by a source providing an image stream.

The laptop computer 600 may also be equipped with a loudspeaker 640 and a microphone 645.

The wireless communication device 600 according to FIG. 8A or FIG. 8B may be configured to detect and track an object, for instance a hand of a user, via the camera 660.

FIG. 9 shows a schematic view of the general structure of a communication device according to FIG. 8A or FIG. 8B. The device 700 comprises a controller 710 which is responsible for the overall operation of the wireless communication device 700 and is preferably implemented by any commercially available CPU ("Central Processing Unit"), DSP ("Digital Signal Processor") or any other electronic programmable logic device. The controller 710 is configured to read instructions from a memory 740 and execute these instructions to control the operation of the wireless communication device 200. The memory 740 may be implemented using any commonly known technology for computer-readable memories such as ROM, RAM, SRAM, DRAM, CMOS, FLASH, DDR, SDRAM or some other memory technology. The memory 740 is used for various purposes by the controller 710, one of them being for storing application data and program instructions 750 for various software modules in the wireless communication device 700. The software modules may include a real-time operating system, drivers for a user interface 720, an application handler as well as various applications 750.

The wireless communication device 700 further comprises the user interface 720, which in the devices 700 of FIGS. 8A and 8B is comprised of the display 620 and the keys 630, 635. The user interface may also comprise the microphone 645 and the loudspeaker 644.

The wireless communication device 700 further comprises wireless communication means 730, which is adapted to allow the wireless communication device 700 to communicate with other devices through the use of different radio frequency technologies. More specifically, the wireless communication means 730 comprises a first communication interface 732 which implements the aforementioned first communication interface 112/122, as referred to above for the preceding Figures. The first communication interface 732 therefore supports short-range wireless beacon broadcast messaging and may, advantageously, be implemented as an iBeacon® and/or Bluetooth Low Energy (BLE)/Bluetooth 4.0 compliant communication interface.

The wireless communication means 730 also comprises a second communication interface 734 which implements the aforementioned second communication interface 114/124, as referred to above for the preceding Figures. The second communication interface 734 therefore supports broadband communication with, inter alia, the server 130. The second communication interface 734 may, advantageously, be implemented as a communication interface compliant with IEEE 802.11, IEEE 802.15, ZigBee, WirelessHART, WiFi, Bluetooth®, WCDMA, HSPA, GSM, UTRAN, UMTS, and LTE, to name a few. It should be noted that, as is commonly known, the wireless communication means 730 may be arranged to communicate according to more than one technology and many different combinations may therefore be available; for example, a smartphone is commonly arranged to communicate according to the Bluetooth® standard, the WiFi standard and the LTE standard.

The wireless communication device 700 is further equipped with a camera 760. The camera 760 is a digital camera that is arranged to take video or still photographs by recording images on an electronic image sensor (not shown).

The camera 760 is operably connected to the controller 710 to provide the controller with a video stream 765, i.e. the series of images captured, for further processing possibly for use in and/or according to one or several of the applications 750.

In one embodiment the camera 760 is an external camera or source of an image stream.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other devices. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

Figure 10:
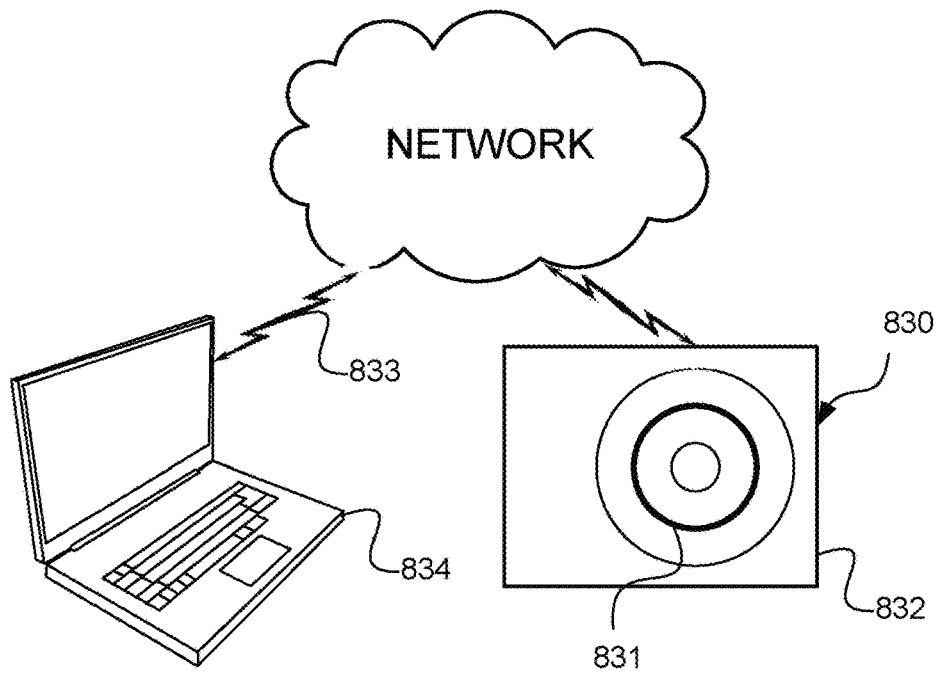
FIG. 10 is a schematic view of a computer-readable medium.

FIG. 10 shows a schematic view of a computer-readable medium as described in the above. The computer-readable medium 830 is in this embodiment a data disc 830. In one embodiment the data disc 830 is a magnetic data storage disc. The data disc 830 is configured to carry instructions 831 that when loaded into a controller, such as a processor, executes a method or procedure according to the embodiments disclosed above. The data disc 830 is arranged to be connected to or within and read by a reading device 832, for loading the instructions into the controller. One such example of a reading device 832 in combination with one (or several) data disc(s) 830 is a hard drive. It should be noted that the computer-readable medium can also be other media such as compact discs, digital video discs, flash memories or other memory technologies commonly used.

The instructions 831 may also be downloaded to a computer data reading device 834, such as a laptop computer or other device capable of reading computer coded data on a computer-readable medium, by comprising the instructions 831 in a computer-readable signal 833 which is transmitted via a wireless (or wired) interface (for example via the Internet) to the computer data reading device 834 for loading the instructions 831 into a controller. In such an embodiment the computer-readable signal 833 is one type of a computer-readable medium 830.

The instructions may be stored in a memory (not shown explicitly in FIG. 10, but referenced as 740 in FIG. 9) of the laptop computer 834.

References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

The various functionality described above with reference to FIGS. 3-7C may be performed in part or fully in a communication device 110/120 comprising a controller as disclosed above with reference to FIGS. 8A, 8B and 9, and/or caused to be performed by executing instructions stored on a computer-readable medium as disclosed with reference to FIG. 10.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method of authenticating an asset in a dynamic, proximity-based network (100) of communication devices (1-6), where the communication devices comprise a first communication interface (112, 122, 232) for establishing the dynamic, proximity-based network by short-range wireless beacon broadcast messaging (113, 123), and a second communication interface (114, 124, 234) for communicating with a server (13, 16, 130) by broadband communication (115, 125), the method involving:
    a first communication device (110) sending (210) an authentication request (AUTH_REQ1) to a second communication device (120) via the first communication interface (112, 122), said asset (126) being associated with the second communication device;
    the second communication device (120) receiving (220) the authentication request (AUTH_REQ1) via the first communication interface (112, 122) and in response communicating (230) with the server (130) via the second communication interface (114, 124) to generate a digital signature (U2_Signed) by encrypting data which includes said asset with a private key (U2_PrK) for the second communication device;
    the second communication device (120) sending (240) a signing completed report message (SIGNING_REP2) about the generation of the digital signature (U2_Signed) to the first communication device (110) via the first communication interface (112, 122); and
    the first communication device (110) receiving (250) the signing completed report message (SIGNING_REP2) via the first communication interface (112, 122) and in response communicating (260) with the server (130) via the second communication interface (114, 124) to retrieve an authentication result (AUTH_RESULT);
    wherein the method further involves the first communication device (110) checking (510) the retrieved authentication result (AUTH_RESULT) and, if the authentication result indicates successful authentication (520), communicating (530) with the server (130) via the second communication interface (114, 124) to add a user of the second communication device (120) to a dynamic, proximity-based group of users of communication devices in the network, the dynamic, proximity-based group supporting interaction between users of the group.

2. The method as defined in claim 1, wherein the asset (126) is any of the following:
    an identifier (UID2) of the second communication device (120) or the user (120a) thereof;
    a user profile (U2_Profile) of the user (120a) of the second communication device (120); and
    a valuable digital content which the second communication device (120) is in control of.

3. The method as defined in claim 1, the method further involving:
    each of said first and second communication devices (110/120) initially sending (310) a registration request (REG_REQ) to the server (130) via the second communication interface (114, 124);
    the server (130) in response:
        generating (320) an identifier (UID1/UID2) and a public/private key pair (U1_PuK/U1_PrK, U2_PuK/U2_PrK) for the respective communication device (110/120); and
        creating and storing (330) a user profile (U1_Profile/U2_Profile) for the respective communication device (110/120), the user profile including the generated identifier (UID1/UID2) and public/private key pair (U1_PuK/U1_PrK, U2_PuK/U2_PrK); and
        returning (340) the generated identifier (UID1/UID2) to the respective communication device (110/120); and
    the respective communication device (110/120) receiving (350) the generated identifier (UID1/UID2) from the server (130) via the second communication interface (114, 124).

4. The method as defined in claim 1, the method further involving:
    the first communication device (110) initially sending (410) an identification request (ID_REQ) to the second communication device (120) via the first communication interface (112, 122);
    the second communication device (120) receiving (420) the identification request (ID_REQ) via the first communication interface (112, 122) and in response communicating (430) with the server (130) via the second communication interface (114, 124) to generate an encrypted identifier (UID2$_{encr}$) by encrypting an identifier (UID2) of the second communication device (120) with a public key (U1_PuK) for the first communication device (110);
    the second communication device (120) sending (440) an identification response (ID_RESP) via the first communication interface (112, 122) to the first communication device (110), the identification response (ID_RESP) containing the encrypted identifier (UID2$_{encr}$); and
    the first communication device (110) receiving (450) the identification response (ID_RESP) via the first communication interface (112, 122) and decrypting (460) the received identification response (ID_RESP) with a private key (U1_PrK) for the first communication device (110) to derive the identifier (UID2) of the second communication device (120).

5. The method as defined in claim 1, wherein interaction between users of the group involves one or more of the following:
content sharing,
social media interaction,
e-commerce transaction,
telephone call,
short text messaging,
multimedia messaging,
email messaging, and
chat conversation.

6. The method as defined in claim 1, the method further involving:
the server (130) storing the generated digital signature (U2_Signed) in, at or for said server; and
the server (130) using the generated digital signature (U2_Signed) as stored in, at or for said server when retrieving the authentication result.

7. A method of authenticating an asset in a dynamic, proximity-based network (100) of communication devices (1-6), where the communication devices comprise a first communication interface (112, 122, 232) for establishing the dynamic, proximity-based network by short-range wireless beacon broadcast messaging (113, 123), and a second communication interface (114, 124, 234) for communicating with a server (13, 16, 130) by broadband communication (115, 125), the method involving:
a first communication device (110) sending (210) an authentication request (AUTH_REQ1) to a second communication device (120) via the first communication interface (112, 122), said asset (126) being associated with the second communication device;
the second communication device (120) receiving (220) the authentication request (AUTH_REQ1) via the first communication interface (112, 122) and in response communicating (230) with the server (130) via the second communication interface (114, 124) to generate a digital signature (U2_Signed) by encrypting data which includes said asset with a private key (U2_PrK) for the second communication device;
the second communication device (120) sending (240) a signing completed report message (SIGNING_REP2) about the generation of the digital signature (U2_Signed) to the first communication device (110) via the first communication interface (112, 122);
the first communication device (110) receiving (250) the signing completed report message (SIGNING_REP2) via the first communication interface (112, 122) and in response communicating (260) with the server (130) via the second communication interface (114, 124) to retrieve an authentication result (AUTH_RESULT);
the method further involving:
the server (130) storing the generated digital signature (U2_Signed) in, at or for said server;
the server (130) using the generated digital signature (U2_Signed) as stored in, at or for said server when retrieving the authentication result;
the server (130) creating a temporary authentication context (TAC) in which the generated digital signature (U2_Signed) is stored;
the server (130) creating an identifier (TAC_ID) of the temporary authentication context (TAC);
the server (130) sending the identifier (TAC_ID) of the temporary authentication context (TAC) to the second communication device (120) over the second communication interface (114, 124);

the second communication device (120) sending the identifier (TAC_ID) of the temporary authentication context (TAC) to the first communication device (110) over the first communication interface (112, 122); and
the first communication device (110) sending the identifier (TAC_ID) of the temporary authentication context (TAC) in an authentication request (AUTH_REQ2) to the server (130) via the second communication interface (114, 124) to retrieve the authentication result (AUTH_RESULT).

8. A first wireless communication device (110) comprising a first communication interface (112, 232) for establishing a dynamic, proximity-based network by short-range wireless beacon broadcast messaging (113, 123), and a second communication interface (114, 234) for communicating with a server (13, 16, 130) by broadband communication (115), the first wireless communication device being configured to:
send (210) an authentication request (AUTH_REQ) to a second communication device (120) via the first communication interface (112), the authentication request pertaining to an asset (126) being associated with the second communication device;
receive (250) a signing completed report message (SIGNING_REP2) from the second communication device (120) via the first communication interface (112); and, in response, communicate (260) with the server (130) via the second communication interface (114) to retrieve an authentication result (AUTH_RESULT); and
check (510) the retrieved authentication result (AUTH_RESULT) and, if the authentication result indicates successful authentication (520), communicate (530) with the server (130) via the second communication interface (114, 124) to add a user of the second communication device (120) to a dynamic, proximity-based group of users of communication devices in the network, the dynamic, proximity-based group supporting interaction between users of the group.

9. The first wireless communication device (110) as defined in claim 8, wherein the asset (126) is any of the following:
an identifier (UID2) of the second communication device (120) or the user (120a) thereof;
a user profile (U2_Profile) of the user (120a) of the second communication device (120); and
a valuable digital content which the second communication device (120) is in control of.

10. A server (13, 16, 130) for use with a first wireless communication device (110) and a second wireless communication device (120), the second wireless communication device (120) comprising a first communication interface (122, 232) for establishing a dynamic, proximity-based network by short-range wireless beacon broadcast messaging (113, 123), and a second communication interface (124, 234) for communicating with the server (13, 16, 130) by broadband communication (125), the second wireless communication device being configured to:
receive (220) an authentication request (AUTH_REQ) via the first communication interface (122) from the first communication device (110), the authentication request pertaining to an asset (126) being associated with the second communication device;
in response, communicate (230) with the server (130) via the second communication interface (124) to generate a digital signature (U2_Signed) by encrypting data which includes said asset with a private key (U2_PrK) for the second communication device; and send (240) a signing completed report message (SIGNING_REP2) about the generation of the digital signature (U2_Signed) to the first communication device (110) via the first communication interface (112, 122), the server being configured to:

communicate (230) with the second communication device (120) via the second communication interface (114, 124) to generate the digital signature (U2_Signed) by encrypting data which includes said asset with the private key (U2_PrK) for the second communication device (120);

communicate (260) with the first communication device (110) via the second communication interface (114, 124) to retrieve the authentication result (AUTH_RESULT); and if the authentication result indicates successful authentication (520), receive a communication from the first communication device (110) via the second communication interface (114, 124) to add a user of the second communication device (120) to a dynamic, proximity-based group of users of communication devices in the network, the dynamic, proximity-based group supporting interaction between users of the group.

11. The server (13, 16, 130) as defined in claim 10, wherein the asset (126) is any of the following:

an identifier (UID2) of the second communication device (120) or the user (120*a*) thereof;

a user profile (U2_Profile) of the user (120*a*) of the second communication device (120); and a valuable digital content which the second communication device (120) is in control of.

* * * * *